United States Patent
McCarthy (10) Patent No.: US 11,584,263 B2
(45) Date of Patent: Feb. 21, 2023

(54) VEHICLE INTERIOR COMPONENT

(71) Applicant: Shanghai Yanfeng Jinqiao Automotive Trim Systems Co. Ltd., Novi, MI (US)

(72) Inventor: David John McCarthy, Holland, MI (US)

(73) Assignee: SHANGHAI YANFENG JINQIAO AUTOMOTIVE TRIM SYSTEMS CO. LTD., Novi, MI (US)

( * ) Notice: Subject to any disclaimer, the term of this patent is extended or adjusted under 35 U.S.C. 154(b) by 0 days.

(21) Appl. No.: 17/569,937

(22) Filed: Jan. 6, 2022

(65) Prior Publication Data

US 2022/0126731 A1   Apr. 28, 2022

Related U.S. Application Data

(63) Continuation of application No. PCT/US2021/036653, filed on Jun. 9, 2021.

(60) Provisional application No. 63/037,848, filed on Jun. 11, 2020.

(51) Int. Cl.
*B60N 2/07* (2006.01)

(52) U.S. Cl.
CPC .................................. *B60N 2/07* (2013.01)

(58) Field of Classification Search
CPC .............................. B60N 2/0725; B60N 2/07
USPC ........................................................ 296/65.13
See application file for complete search history.

(56) References Cited

U.S. PATENT DOCUMENTS

| | | | |
|---|---|---|---|
| 4,936,527 A | 6/1990 | Gorges | |
| 6,145,911 A | 11/2000 | Sturt et al. | |
| 7,191,981 B2 | 3/2007 | Laib et al. | |
| 7,988,231 B2 | 8/2011 | Phinney | |
| 9,399,413 B2 | 7/2016 | Phinney | |
| 10,829,007 B2 | 11/2020 | Kapusky et al. | |
| 11,413,944 B2 * | 8/2022 | Thomas, III | ........ B29C 48/0022 |

(Continued)

FOREIGN PATENT DOCUMENTS

| | | | | |
|---|---|---|---|---|
| CN | 113147526 A | * | 7/2021 | |
| DE | 102011011505 A1 | * | 8/2012 | ............. B60N 2/005 |

(Continued)

OTHER PUBLICATIONS

International Search Report and Written Opinion received for PCT Application Serial No. PCT/US2021/036653 dated Sep. 1, 2021, 19 pages.

*Primary Examiner* — Hilary L Gutman (74) *Attorney, Agent, or Firm* — Amin, Turocy & Watson, LLP (57) ABSTRACT

A track system for providing a movable component in a vehicle interior may comprise a track assembly comprising a track for the movable component and a base comprising a chassis for the movable component to be movable along the track. The track assembly may comprise a track cover. The chassis may move the track cover to uncover the track under the chassis. The track cover may comprise a front section, a rear section and a middle section. The front section and the rear section may cover the track. The chassis may comprise a ramp configured to raise the front section as the chassis moves in a forward direction. The middle section may extend below the front section, the rear section and the chassis. The track cover may slide along a pulley between the front section and the middle section.

18 Claims, 11 Drawing Sheets

(56) References Cited

U.S. PATENT DOCUMENTS

| | | | |
|---|---|---|---|
| 2006/0017296 A1* | 1/2006 | Meltzer | B60R 19/44 |
| | | | 293/126 |
| 2009/0199480 A1 | 8/2009 | Ehrhard | |
| 2014/0091610 A1 | 4/2014 | Clark et al. | |
| 2019/0010757 A1 | 1/2019 | Coenraets | |
| 2020/0086767 A1* | 3/2020 | Ogasawara | B60N 2/067 |
| 2020/0156509 A1 | 5/2020 | Yamamoto et al. | |
| 2020/0215937 A1* | 7/2020 | Petot | B60R 16/037 |
| 2022/0134911 A1* | 5/2022 | Kim | B60R 16/03 |
| | | | 248/429 |

FOREIGN PATENT DOCUMENTS

| | | | | |
|---|---|---|---|---|
| KR | 2273872 B1 * | 7/2021 | | |
| WO | WO-2010137970 A2 * | 12/2010 | | B60N 2/0725 |
| WO | WO-2018235585 A1 * | 12/2018 | | B60N 2/07 |

* cited by examiner

VEHICLE INTERIOR COMPONENT

CROSS-REFERENCE TO RELATED APPLICATIONS

The present application is a continuation of PCT/International Patent Application No. PCT/US2021/036653 titled "VEHICLE INTERIOR COMPONENT" filed Jun. 9, 2021, which claims the benefit of U.S. Provisional Patent Application No. 63/037,848 titled "VEHICLE INTERIOR COMPONENT" filed Jun. 11, 2020.

The present application claims priority to and incorporates by reference in full the following patent applications: (a) U.S. Provisional Patent Application No. 63/037,848 titled "VEHICLE INTERIOR COMPONENT" filed Jun. 11, 2020; (b) PCT/International Patent Application No. PCT/US2021/036653 titled "VEHICLE INTERIOR COMPONENT" filed Jun. 9, 2021.

FIELD

The present invention relates to a track system for providing a movable component in an interior of a vehicle.

BACKGROUND

It is known to provide a track system for providing a movable component in an interior of a vehicle.

It would be advantageous to provide an improved track system for a movable component of an interior of a vehicle.

It would be advantageous to provide an improved track system for a movable component of an interior of a vehicle comprising a track with a track cover configured to fit within a track opening.

It would be advantageous to provide an improved track system for a movable component of an interior of a vehicle comprising a track with a track cover configured to fit within a track opening as the movable component is moved along the track.

SUMMARY

The present invention relates to a track system for providing a movable component in an interior of a vehicle comprising a track assembly comprising a track for the movable component and a base comprising a chassis for the movable component configured to be movable along the track of the track assembly. The track assembly may comprise a track cover. The chassis may be configured to move the track cover to uncover the track under the chassis. The track cover may comprise a front section, a rear section and a middle section. The chassis may comprise a ramp configured to raise the front section as the chassis moves in a forward direction. The front section and the rear section may be configured to cover the track. The middle section may be raised relative to the front section and the rear section by the chassis. The chassis may comprise a ramp at a transition from the rear section to the middle section. The chassis may comprise a wheel configured to raise the front section as the chassis moves in a forward direction; the wheel may be configured to raise the rear section as the chassis moves in a rearward direction.

The present invention relates to a track system for providing a movable component in an interior of a vehicle comprising a track assembly comprising a track for the movable component and a base comprising a chassis for the movable component configured to be movable along the track of the track assembly. The track assembly may comprise a track cover. The chassis may be configured to move the track cover to uncover the track under the chassis. The track cover may comprise a front section, a rear section and a middle section. The front section and the rear section may be configured to cover the track. The middle section may extend below the front section, the rear section and the chassis. The track cover may slide along a pulley between the front section and the middle section.

The present invention relates to a track system for providing a movable component in an interior of a vehicle comprising a track assembly comprising a track for the movable component and a base comprising a chassis for the movable component configured to be movable along the track of the track assembly. The track assembly may comprise a track cover. The chassis may be configured to move the track cover to uncover the track under the chassis. The track cover may comprise a top side facing the vehicle interior, a left side and a right side. At least one of the left side and the right side forms an acute angle with the top side. At least one of the left side and the right side may be configured to be covered by the top side.

The present invention relates to a track system for providing a movable component in an interior of a vehicle comprising a track assembly comprising a track for the movable component, a base comprising a chassis for the movable component configured to be movable along the track of the track assembly and an interface between the track cover and a floor of the vehicle. The track assembly may comprise a track cover. The chassis may be configured to move the track cover to uncover the track under the chassis. The track cover may comprise a top side facing the vehicle interior, a left side and a right side. The interface may comprise an angled surface of the track cover spaced from an angled surface of the floor of the vehicle.

The present invention relates to a track system for providing a movable component in an interior of a vehicle comprising a track assembly comprising a track for the movable component and a base comprising a chassis for the movable component configured to be movable along the track of the track assembly. The track assembly may comprise a track cover. The chassis may be configured to move the track cover to uncover the track under the chassis. The track cover may comprise an undercut configured to align with a flange in a floor of the vehicle. The track cover may comprise a generally constant cross section. The cross section of the track cover may comprise a generally trapezoidal shape. The track cover may comprise an extrusion. The track cover may be seated in a track opening as the component is moved along the track. The track cover may be configured to be sealed within the track opening.

The present invention relates to a track system for providing a movable component in an interior of a vehicle comprising a track assembly comprising a track for the movable component and a base comprising a chassis for the movable component configured to be movable along the track of the track assembly. The track assembly may comprise a track cover. The chassis may be configured to move the track cover to uncover the track under the chassis. The track cover may comprise a hidden section configured to move in a direction opposite a direction of movement of the chassis. The track assembly may comprise a pulley arrangement; the pulley arrangement may comprise a set of pulleys. The track cover may comprise a set of belts. The pulley arrangement may comprise a set of pulleys; the set of pulleys may be configured to engage the set of belts.

The present invention relates to a track system for providing a movable component in an interior of a vehicle comprising a track assembly comprising a track for the movable component and a base comprising a chassis for the movable component configured to be movable along the track of the track assembly; the track assembly may comprise a track cover; the chassis may be configured to move the track cover to uncover the track under the chassis. The track cover may be configured to be raised by the chassis to uncover the track. The chassis may be configured to lower the track cover to cover the track. The track cover may comprise a front section, a rear section and a middle section. The front section and the rear section may be configured to cover the track; the middle section may be raised relative to the front section and the rear section by the chassis. The chassis may comprise a ramp at a transition from the rear section to the middle section. The chassis may comprise a ramp configured to raise the front portion as the chassis moves in a forward direction. The chassis may comprise a ramp configured to raise the rear portion as the chassis moves in a rearward direction. The chassis may comprise a wheel configured to raise the front portion as the chassis moves in a forward direction. The chassis may comprise a wheel configured to raise the rear portion as the chassis moves in a rearward direction. The chassis may comprise a wheel configured to lower the middle portion as the chassis moves along the track. The front section and the rear section may be configured to cover the track; the middle section may extend below the front section, the rear section and the chassis. The front section and the rear section may face the vehicle interior; the middle section may be oriented opposite the front section and the rear section. The front section may be coupled to a front of the chassis. The track cover may transition from the front section to the middle section at a pulley. Orientation of the track cover may invert as the track cover transitions from the front section to the middle section. The track cover may slide along a pulley between the front section and the middle section. The track cover may be configured to translate with the chassis. The track cover may comprise a top side facing the vehicle interior, a left side and a right side. At least one of the left side and the right side may form an acute angle with the top side. At least one of the left side and the right side may be configured to be covered by the top side. An interface may be configured between the track cover and a floor of the vehicle. The interface may comprise an angled surface of the track cover spaced from an angled surface of the floor of the vehicle. The track cover may comprise an undercut configured to align with a flange in a floor of the vehicle. The track cover may comprise a generally constant cross section. A cross section of the track cover may comprise a generally trapezoidal shape. The track cover may comprise an extrusion. The track cover may be coupled to the chassis. The track cover may be configured to bend to uncover the track. The track cover may be configured to bend about an axis generally orthogonal to a direction of travel of the chassis. The track cover may be configured to move along a generally curved path. The track cover may comprise an exposed section and a hidden section; the hidden section may be configured to move in a generally opposite direction relative to a direction of movement of the exposed section. The track cover may comprise a hidden section configured to move in a direction opposite a direction of movement of the chassis.

The present invention relates to a track system for providing a movable component in an interior of a vehicle comprising a track for the movable component comprising a track opening and a track cover configured to cover the track opening and a base comprising a chassis for the movable component configured to be movable along the track opening of the track; the track cover may be configured to be raised from the track opening to uncover the track opening of the track. The track cover may be configured to be lowered into the track opening to cover the track opening of the track. A mechanism may be configured for positioning of the track cover relative to the track opening. The mechanism may be configured to cover the track opening with the track cover as the movable component moves along the track opening. The mechanism may be configured to lower the track cover on the track opening as the component is moved along the track. The mechanism may be configured to lift the track cover from the track opening as the component is moved along the track. The mechanism may be on the chassis. The mechanism may comprise a set of pulleys. The mechanism may comprise a set of ramps. The mechanism may comprise a set of guides. The track cover may be guided into the track opening by the set of guides. The track cover may be movable with the chassis. The track cover may be stationary relative to the chassis as installed into the track opening. The track cover may be seated in the track opening as the component is moved along the track. The track cover may be installed into the track opening as the component is moved along the track. The track cover may be sealed within the track opening as the component is moved along the track. The track cover may be unsealed from the track opening as the component is moved along the track. The track cover may comprise a central opening. The track cover may comprise a hollow track cover. The track cover may comprise a T-shaped cross-section. The track cover may comprise an I-shaped cross-section. The track cover may comprise a wedge-shaped cross-section. The track cover may comprise a belt having a generally flat profile. The track cover may comprise a generally curved profile. The track cover may comprise a flap configured to fit over an edge of the track opening. The track may comprise flanges at the track opening; the track may be configured to fit onto the flanges at the track opening. The track cover may comprise a generally flexible strip. The track cover may comprise a plastic material. The track cover may comprise an elastomeric material. The track cover may comprise a groove configured to fit onto an edge of the track opening. The track cover may comprise at least one of (a) a wedge-shaped cross-section; (b) a T-shaped cross-section; (c) an I-shaped cross-section. The track cover may comprise a groove configured to fit onto a flange at the track opening. The track cover may comprise an I-shaped cross-section. The track cover may be configured to be sealed within the track opening. The movable component may be configured to be movable within the track opening of the track and the track cover may be configured to fit within the track opening of the track. The track cover may be moved from the track opening as the movable component is moved within the track opening. The track cover may be positioned within the track opening as the movable component is moved within the track opening.

The present invention relates to a track system for providing a movable component in an interior of a vehicle comprising a track assembly comprising a track for the movable component; and a base comprising a chassis for the movable component configured to be movable along the track of the track assembly. The track assembly may comprise a track cover. The base may comprise a set of guides configured to engage the track of the track assembly. The track may comprise a set of tracks. The set of guides may comprise a set of wheels configured for the track of the track assembly. The track cover may be configured to cover the track. The track assembly may comprise a support for the base. The support may comprise a ramp. The ramp may comprise a set of ramps; the set of guides of the base may be configured to engage the set of ramps of the track assembly. The track cover may comprise a set of track covers; the set of track covers may be configured to engage the set of ramps. The track cover may comprise a set of track covers; the set of guides may comprise a set of wheels; the set of wheels may be configured to engage the set of track covers. The track assembly may comprise a set of ramps; the set of wheels may be configured to engage the set of track covers on the set of ramps. The set of track covers may comprise a set of belts engaged with a set of pulleys. The track assembly may comprise a pulley arrangement. The pulley arrangement may comprise the set of pulleys. The track assembly may comprise a pulley arrangement. The set of track covers may comprise a set of belts. The pulley arrangement may comprise a set of pulleys. The set of pulleys may be configured to engage the set of belts. The track cover may comprise a set of track covers; the set of guides may be configured to engage the set of track covers. The set of track covers may comprise a set of belts; the set of guides may be configured to engage the set of belts. The set of guides may be configured to engage the set of belts engaged with a set of pulleys. The system may comprise a module configured for operation of the track assembly. The track assembly may comprise a link coupled to the chassis. The link may comprise a chain coupled to a flange on the chassis. The track assembly may be configured to be installed in the interior of the vehicle. The movable component may comprise at least one of a console; a floor console; a center console; a seat; an armrest; a module; a vehicle interior component.

DESCRIPTION

Referring to FIGS. 1A, 1B, 2A and 2B, according to an exemplary embodiment, vehicle interior components shown as a seat S and a component/movable component shown as console C may be provided for a vehicle V with an interior I. According to an exemplary embodiment, the vehicle may comprise a conventional vehicle or autonomous vehicle.

According to an exemplary embodiment as shown schematically in FIGS. 2A, 2B, 3A, 3B, 4A, 4B, 5A-5C, 6, 7A, 7B, 8A, 8B, 9A-9C, 10, 11A, 11B, 12A-12B and 13A-13E, a track system TS for a movable component shown as console C in the interior I of the vehicle V may comprise a track assembly comprising a track TR for the movable component/console C and a base BS comprising a chassis CH for the movable component/console C configured to be movable along track assembly/track TR; track system TS for movable component/console C may comprise track assembly/track TR with a track cover TC configured to fit within a track opening TP (e.g. with track cover TC lowered into/lifted from track opening TP as movable component C is moved along track TR). As shown schematically in FIGS. 3A-3B, 4A-4B, 5A-5C and 9A-9C, track assembly TR may comprise a track cover TC comprising a strip/belt BL configured to fit within track opening TP. See also FIGS. 13A-13E.

Exemplary Embodiments—A

According to an exemplary embodiment shown schematically in FIGS. 2A-2B, 3A-3B, 4A-4B, 5A-5C, 6A-6B, 7A-7B, 8A-8B, 9A-9C, 10A-10B, 11A-11B, 12A-12B and 13A-13E, a track system TS for providing a movable component C in an interior of a vehicle may comprise a track assembly TR comprising a track for movable component C and a base BS comprising a chassis CH for movable component C configured to be movable along the track of track assembly TR; track assembly TR may comprise a track cover TC; chassis CH may be configured to move track cover TC to uncover the track under chassis CH. According to an exemplary embodiment shown schematically in FIGS. 2A-2B, 3A-3B, 4A-4B, 5A-5C, 6A-6B, 7A-7B, 8A-8B, 9A-9C, 10A-10B, 11A-11B, 12A-12B and 13A-13E, a track system TS for providing a movable component C in an interior of a vehicle may comprise a track TR for movable component C comprising a track opening TP and a track cover TC configured to cover track opening TP and a base BS comprising a chassis CH for movable component C configured to be movable along track opening TP of track TR; track cover TC may be configured to be raised from track opening TP to uncover track opening TP of track TR; track cover TC may be configured to be lowered into track opening TP to cover track opening TP of track TR.

As shown schematically in FIGS. 3A-3B, 4A-4B, 5A-5B, 6A-6B, 7A-7B, 8A-8B, 9A-9B, 10A-10B, 11A-11B and 12A-12B, a mechanism may be configured for positioning of track cover TC relative to track opening TP; the mechanism may be configured to cover track opening TP with track cover TC as movable component C moves along track opening TP; the mechanism may be configured to lower track cover TC on track opening TP as component C is moved along track TR; the mechanism may be configured to lift track cover TC from track opening TP as component C is moved along track TR; the mechanism may be on chassis CH. As shown schematically in FIGS. 4A-4B, 9A-9B, 10A-10B, 11A-11B and 12A-12B, the mechanism may comprise a set of pulleys. As shown schematically in FIGS. 3A-3B, 5A-5B, 6A-6B, 7A-7B and 8A-8B, the mechanism may comprise a set of ramps RM. As shown schematically in FIGS. 4A-4B, 9A-9B, 10A-10B, 11A-11B and 12A-12B, the mechanism may comprise a set of guides GD; track cover TC may be guided into track opening TP by set of guides GD.

As shown schematically in FIGS. 2A-2B, 3A-3B, 4A-4B, 5A-5B and 9A-9B, track cover TC may be movable with chassis CH; track cover TC may be stationary relative to chassis CH as installed into track opening TP. As shown schematically in FIGS. 2A-2B and 13A-13E, track cover TC may be seated in track opening TP as component C is moved along track TR; track cover TC may be installed into track opening TP as component C is moved along track TR; track cover TC may be sealed within track opening TP as component C is moved along track TR; track cover TC may be unsealed from track opening TP as component C is moved along the track. See also FIGS. 3A-3B, 4A-4B, 5A-5B and 9A-9B.

As shown schematically in FIGS. 3A-3B, 4A-4B, 5A-5B and 9A-9B, track cover TC may be configured to be raised by chassis CH to uncover the track. Chassis CH may be configured to lower track cover TC to cover the track. Track cover TC may comprise a front section, a rear section and a middle section. The front section and the rear section may be configured to cover track TR; the middle section may be raised relative to the front section and the rear section by chassis CH. See also FIGS. 3A-3B, 4A-4B, 5A-5B, 6A-6B, 7A-7B, 8A-8B, 9A-9B, 10A-10B, 11A-11B and 12A-12B.

As shown schematically in FIGS. 3A-3B, 5A-5B, 6A-6B, 7A-7B and 8A-8B, chassis CH may comprise a ramp RM at a transition from the rear section to the middle section. Chassis CH may comprise a ramp RM configured to raise the front portion as chassis CH moves in a forward direction. Chassis CH may comprise a ramp RM configured to raise the rear portion as chassis CH moves in a rearward direction. As shown schematically in FIGS. 3A-3B, 5A-5B, 6A-6B, 7A-7B and 8A-8B, chassis CH may comprise a wheel WH configured to raise the front portion as chassis CH moves in a forward direction; chassis CH may comprise a wheel WH configured to raise the rear portion as chassis CH moves in a rearward direction; chassis CH may comprise a wheel WH configured to lower the middle portion as chassis CH moves along the track; the front section and the rear section may be configured to cover the track, the middle section may extend below the front section, the rear section and chassis CH; the front section and the rear section may face the vehicle interior; the middle section may be oriented opposite the front section and the rear section; the front section may be coupled to a front of chassis CH; track cover TC may transition from the front section to the middle section at a pulley; orientation of track cover TC may invert as track cover TC transitions from the front section to the middle section.

As shown schematically in FIGS. 4A-4B, 9A-9B, 10A-10B, 11A-11B and 12A-12B, track cover TC may slide along a pulley PL between the front section and the middle section. Track cover TC may be configured to translate with chassis CH; track cover TC may comprise a top side facing the vehicle interior, a left side and a right side; at least one of the left side and the right side may form an acute angle with the top side; at least one of the left side and the right side may be configured to be covered by the top side. An interface may be configured between track cover TC and a floor of the vehicle; the interface may comprise an angled surface of track cover TC spaced from an angled surface of the floor of the vehicle.

Figure 1A:
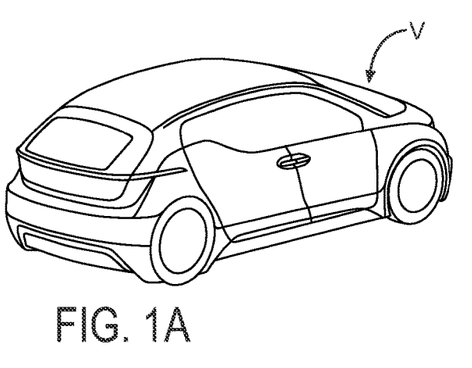
FIG. 1A a schematic perspective view of a vehicle according to an exemplary embodiment.
Figure 1B:
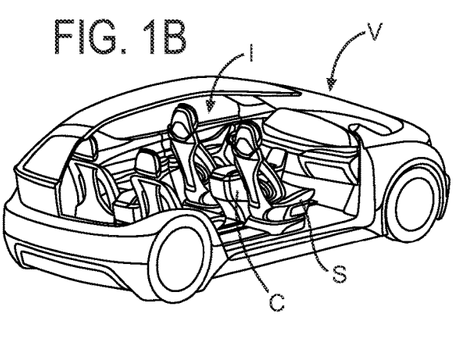
FIG. 1B is a schematic perspective cut-away view of the vehicle showing a vehicle interior according to an exemplary embodiment.
Figure 2A:
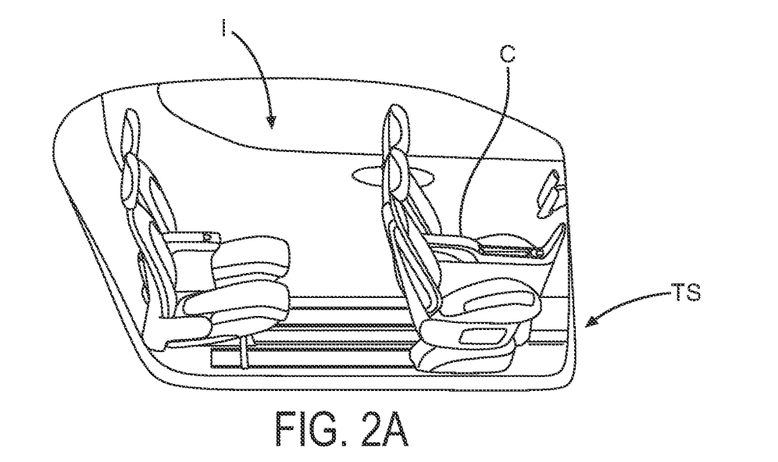
FIG. 2A is a schematic perspective cut-away view of the vehicle showing a vehicle interior according to an exemplary embodiment.
Figure 2B:
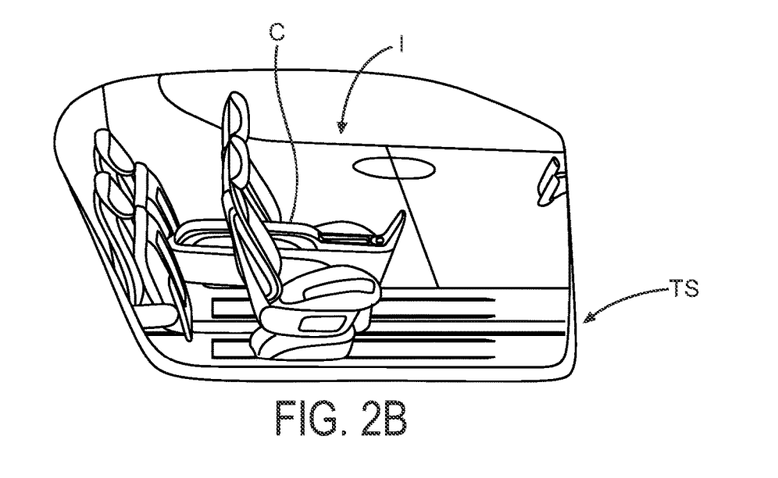
FIG. 2B is a schematic perspective cut-away view of the vehicle showing a vehicle interior according to an exemplary embodiment.
Figures 3A, 3B:
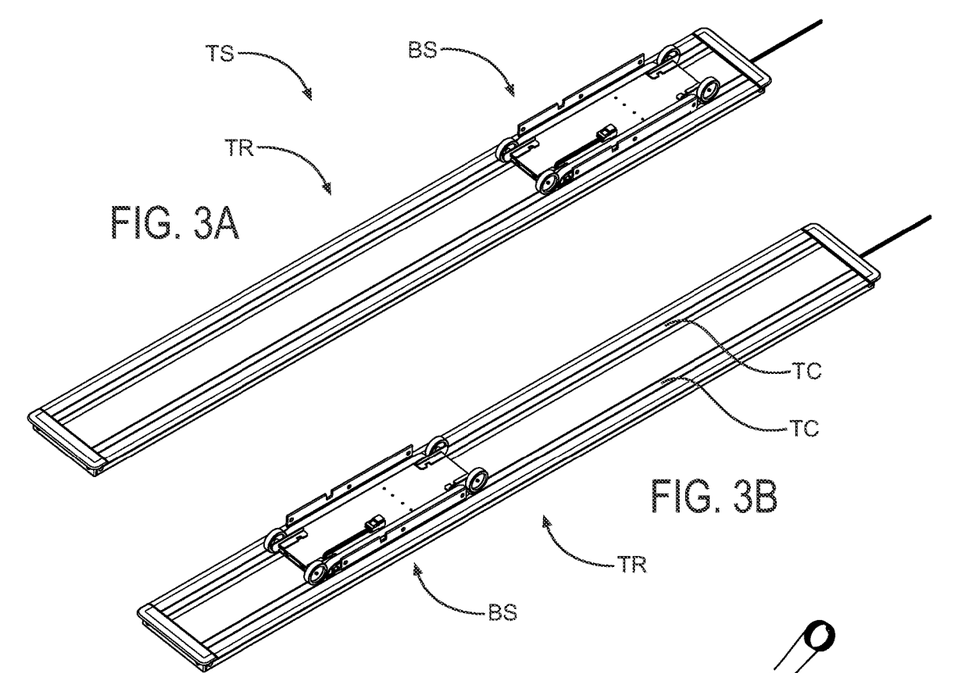
FIGS. 3A and 3B are schematic perspective views of a track system for an interior of a vehicle according to an exemplary embodiment.
Figures 4A, 4B:
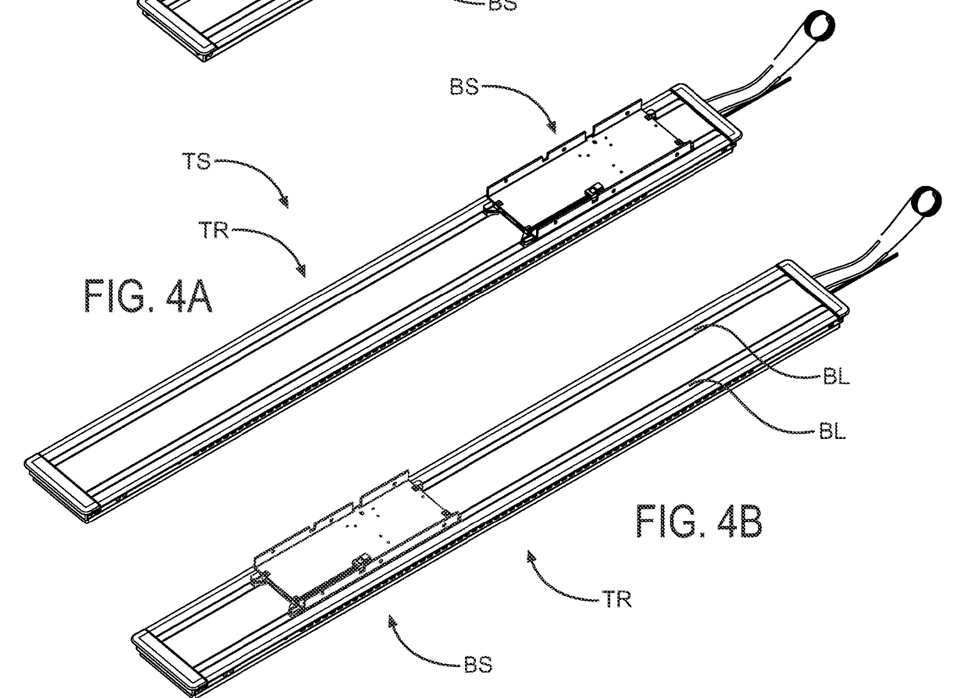
FIGS. 4A and 4B are schematic perspective views of a track system for an interior of a vehicle according to an exemplary embodiment.
Figure 5A:
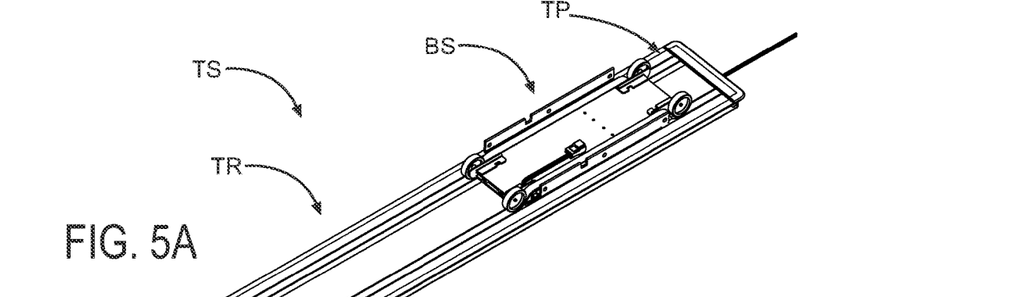
FIG. 5A is schematic perspective view of a track system for an interior of a vehicle according to an exemplary embodiment.
Figures 5B, 5C:
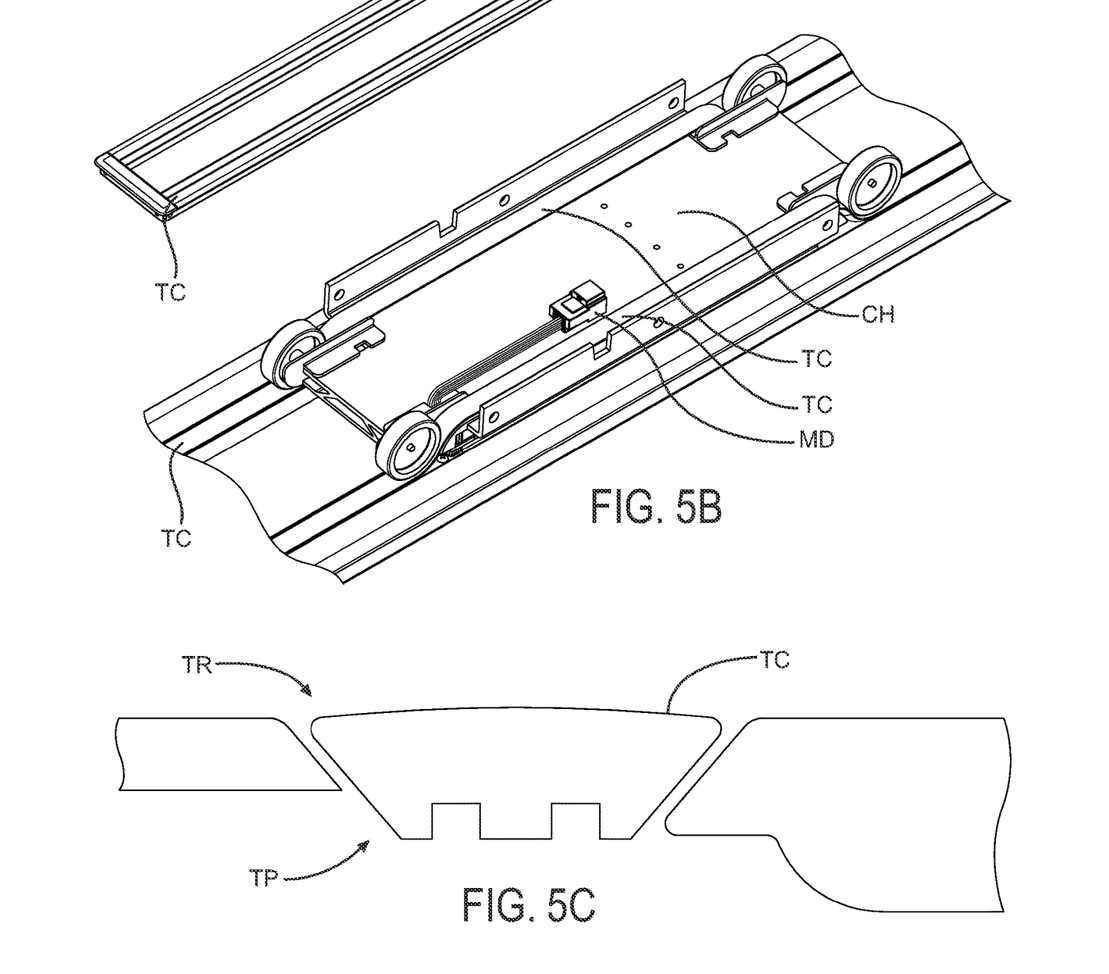
FIG. 5B is a schematic perspective cut-away view of a track system for an interior of a vehicle according to an exemplary embodiment.
FIG. 5C is a schematic partial section view of a track of a track system for an interior of a vehicle according to an exemplary embodiment.
Figure 6A:
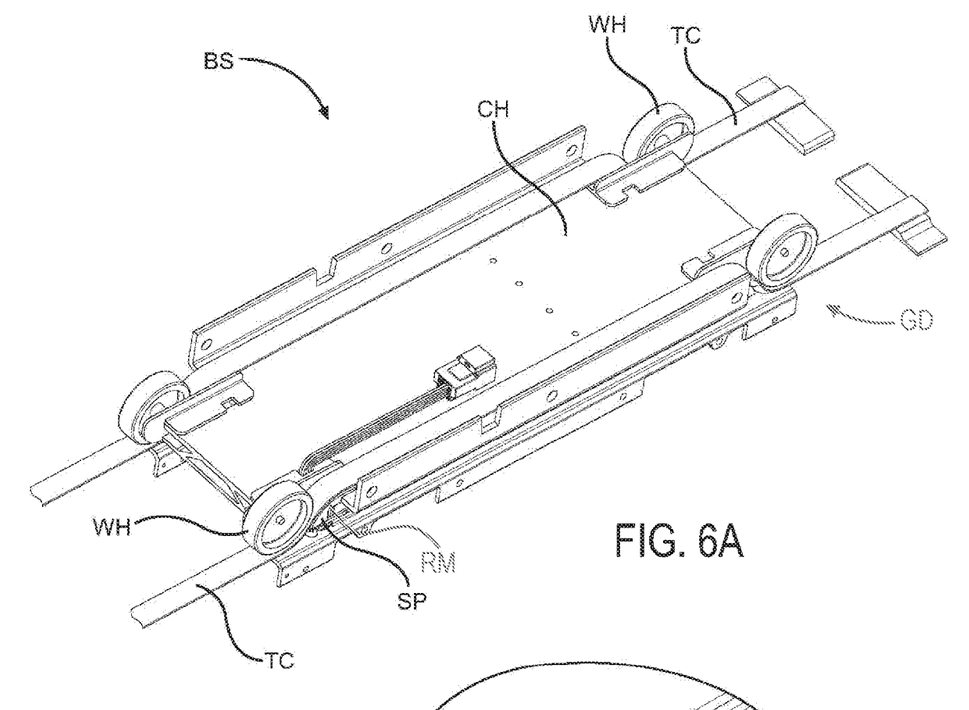
FIG. 6A is a schematic perspective partial cut-away view of a track system for an interior of a vehicle according to an exemplary embodiment.
Figure 6B:
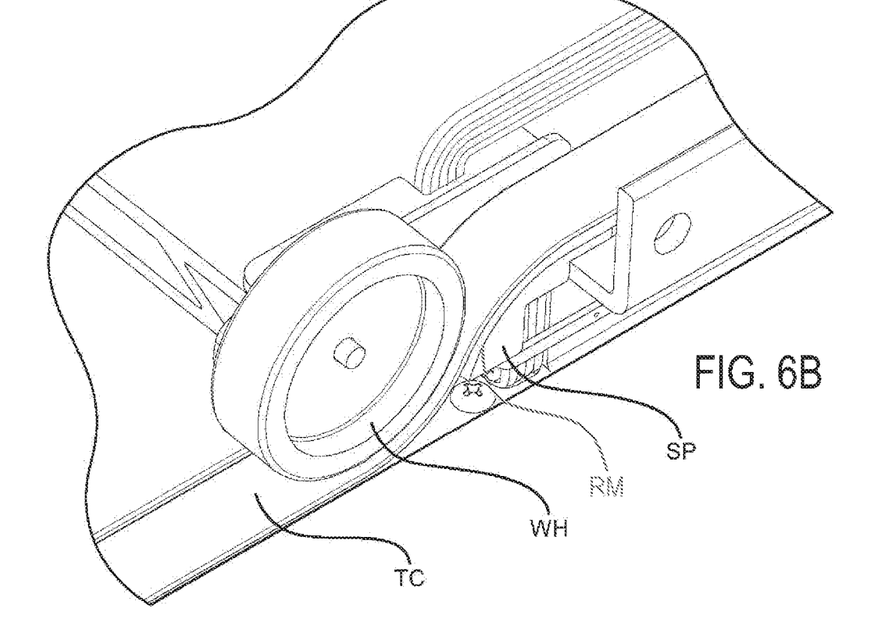
FIG. 6B is a schematic perspective cut-away view of a track system for an interior of a vehicle according to an exemplary embodiment.
Figure 7A:
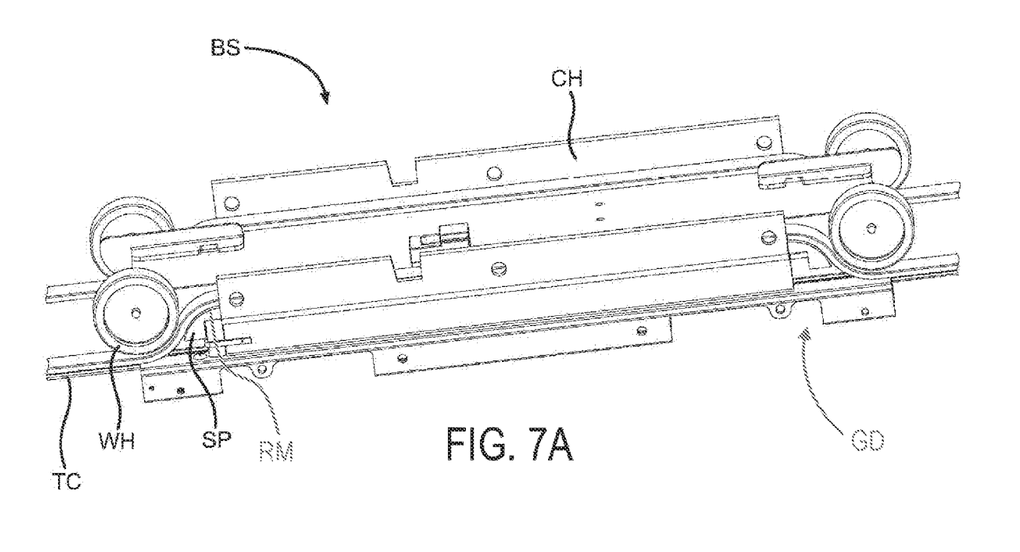
FIG. 7A is a schematic perspective cut-away view of a track system for an interior of a vehicle according to an exemplary embodiment.
Figure 7B:
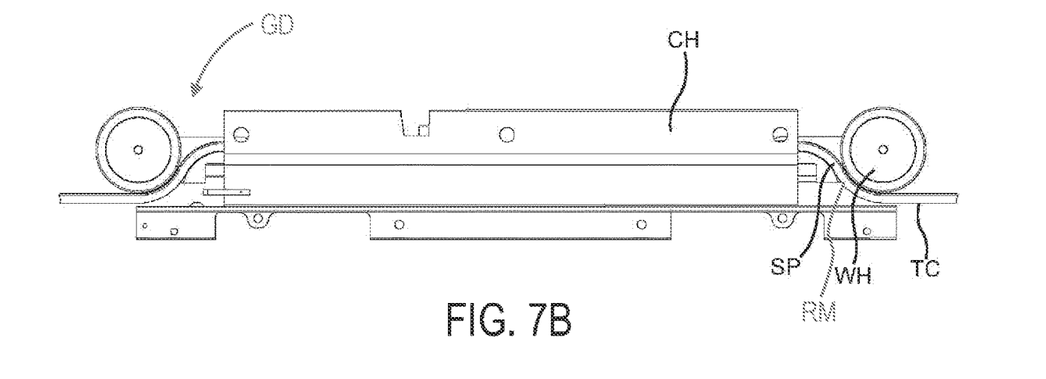
FIG. 7B is schematic side cut-away view of a track system for an interior of a vehicle according to an exemplary embodiment.
Figure 8A:
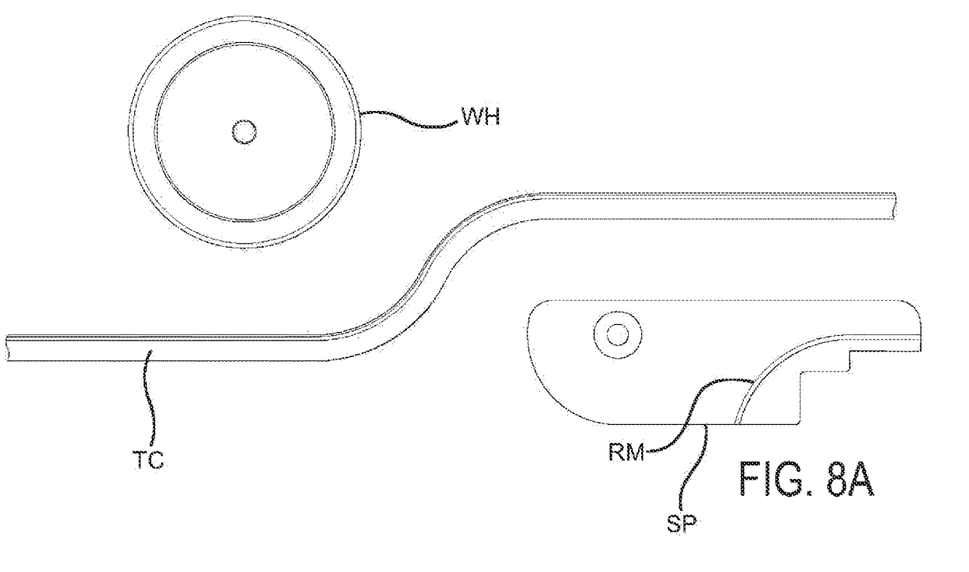
FIG. 8A is a schematic partial exploded view of a track system for an interior of a vehicle according to an exemplary embodiment.
Figure 8B:
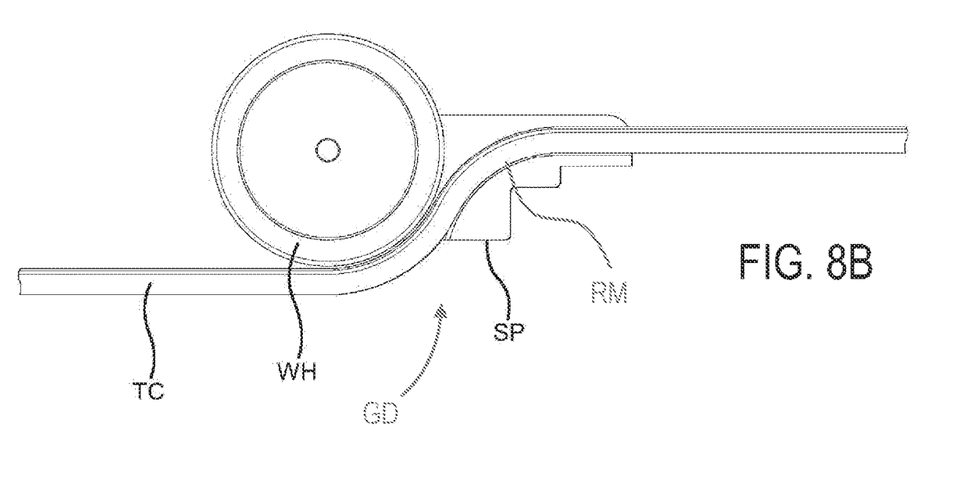
FIG. 8B is schematic cut-away side view of a track system for an interior of a vehicle according to an exemplary embodiment.
Figures 9A, 9B:
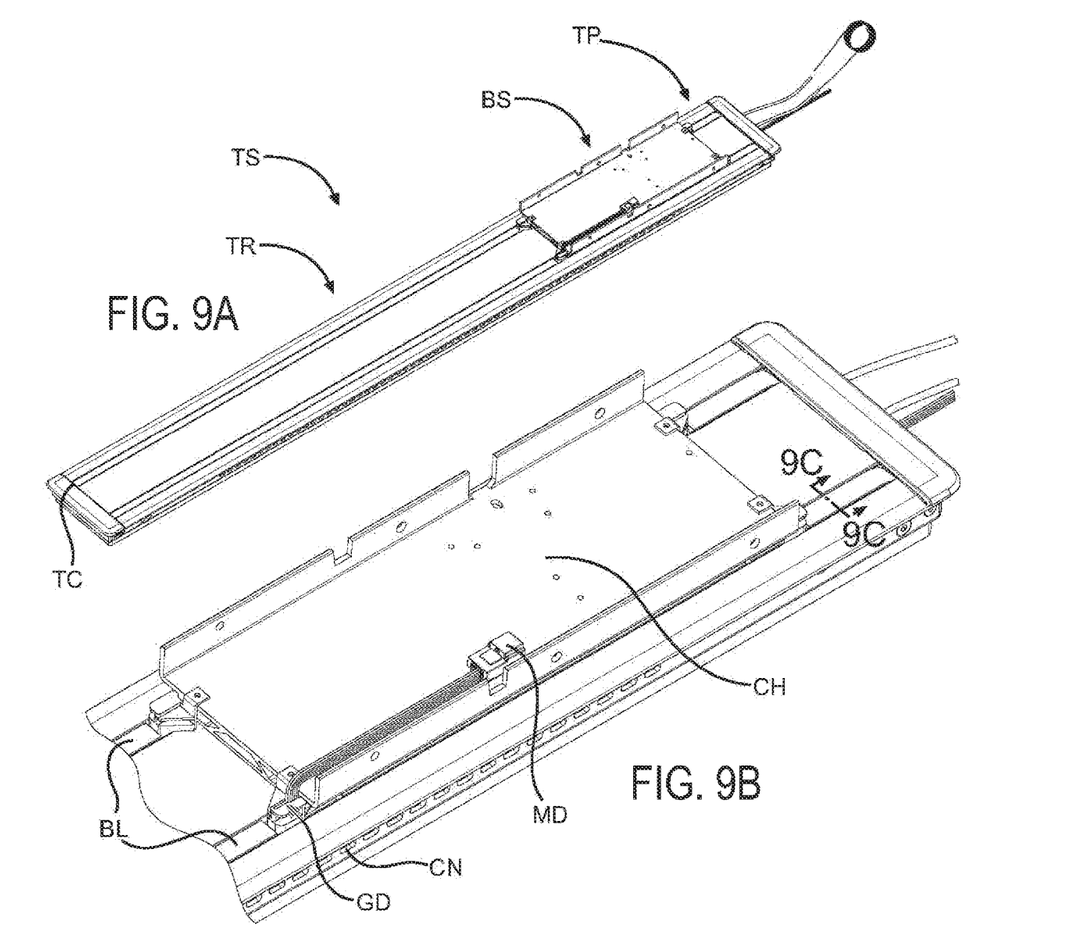
FIG. 9A is schematic perspective view of a track system for an interior of a vehicle according to an exemplary embodiment.
FIG. 9B is a schematic perspective cut-away view of a track system for an interior of a vehicle according to an exemplary embodiment.
Figure 9C:
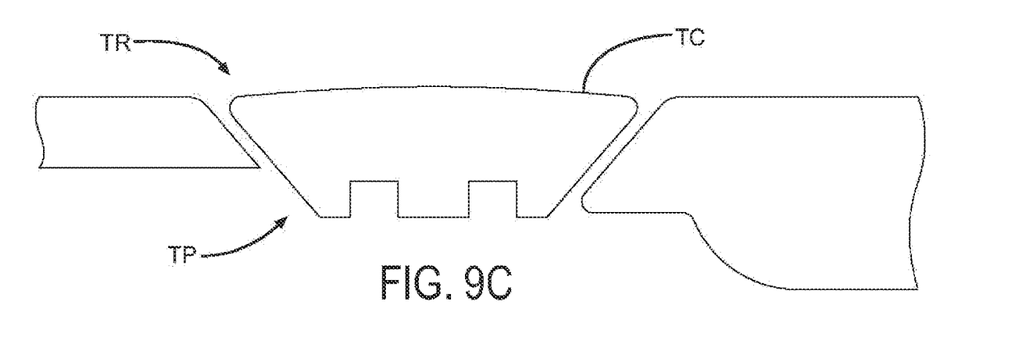
FIG. 9C is a schematic partial section view of a track of a track system for an interior of a vehicle according to an exemplary embodiment.
Figure 10A:
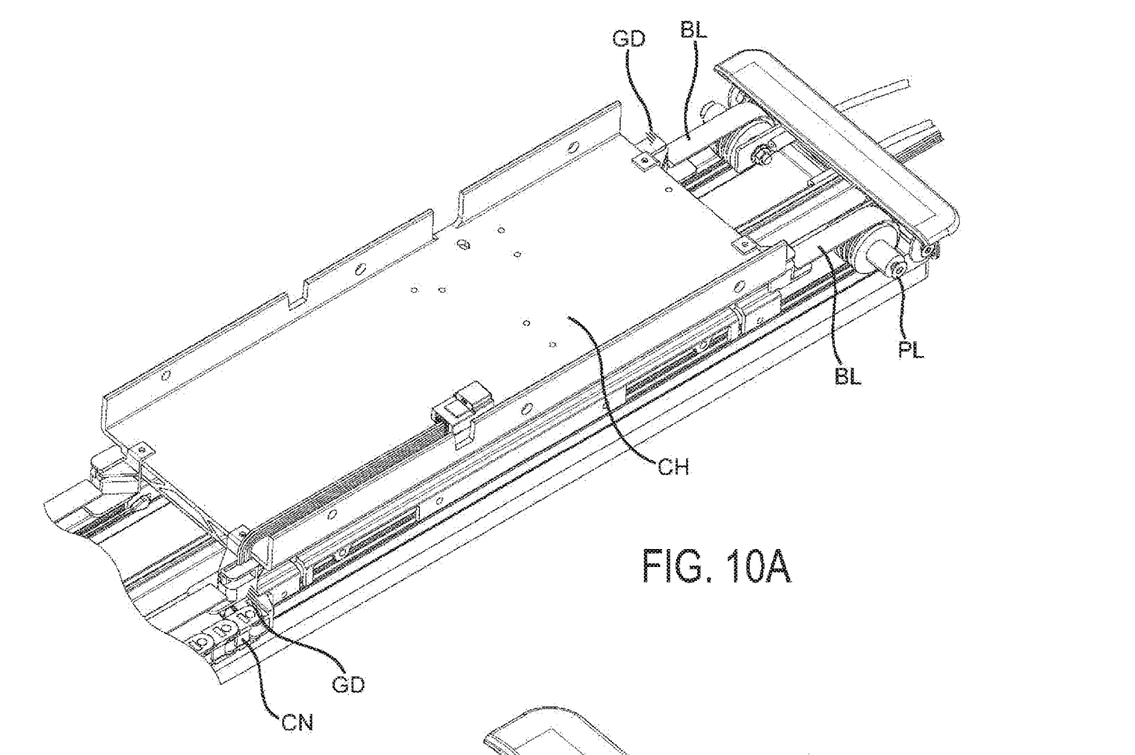
FIG. 10A is a schematic perspective partial cut-away view of a track system for an interior of a vehicle according to an exemplary embodiment.
Figure 10B:
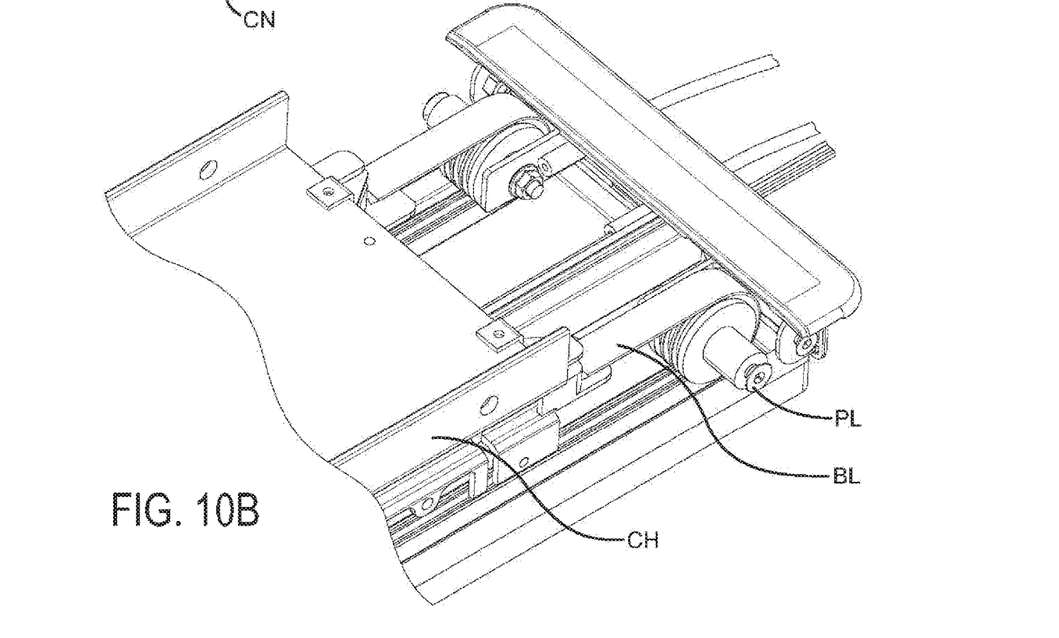
FIG. 10B is a schematic perspective cut-away view of a track system for an interior of a vehicle according to an exemplary embodiment.
Figure 11A:
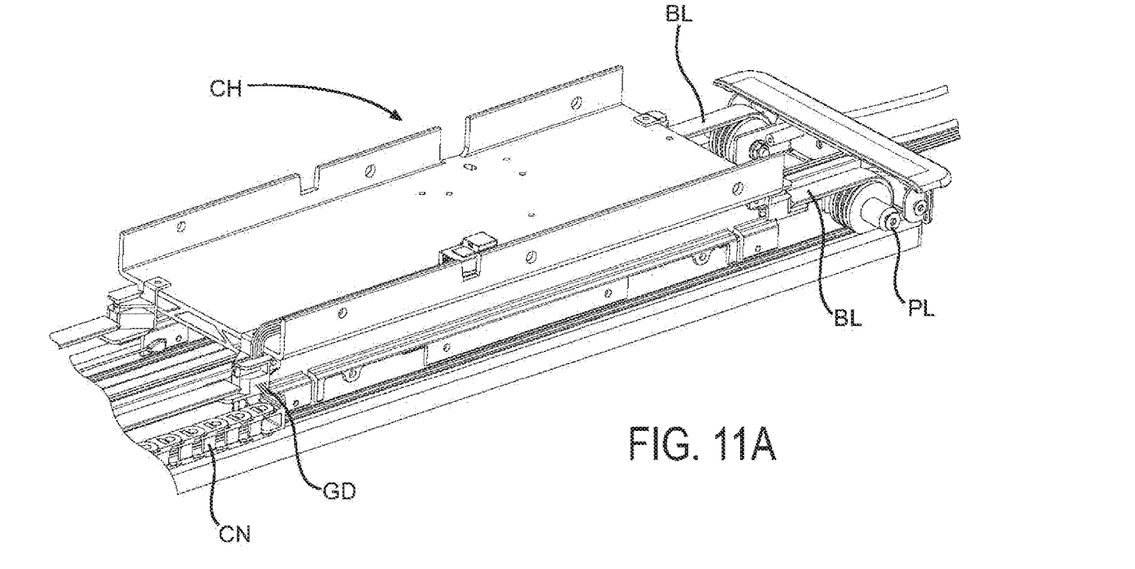
FIG. 11A is a schematic perspective cut-away view of a track system for an interior of a vehicle according to an exemplary embodiment.
Figure 11B:
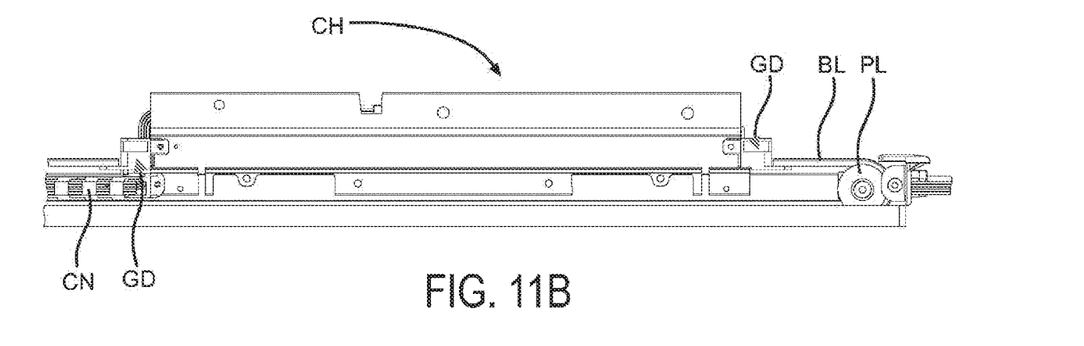
FIG. 11B is schematic side cut-away view of a track system for an interior of a vehicle according to an exemplary embodiment.
Figure 12A:
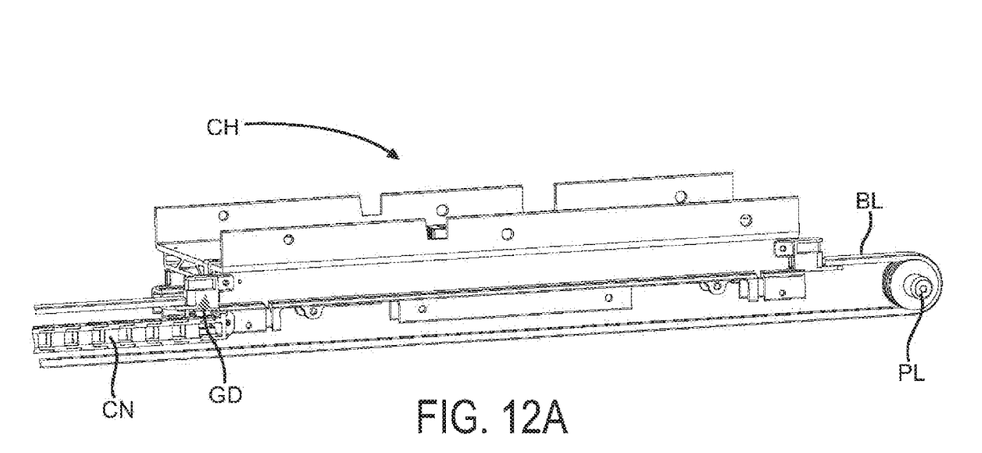
FIG. 12A is a schematic perspective cut-away view of a track system for an interior of a vehicle according to an exemplary embodiment.
Figure 12B:
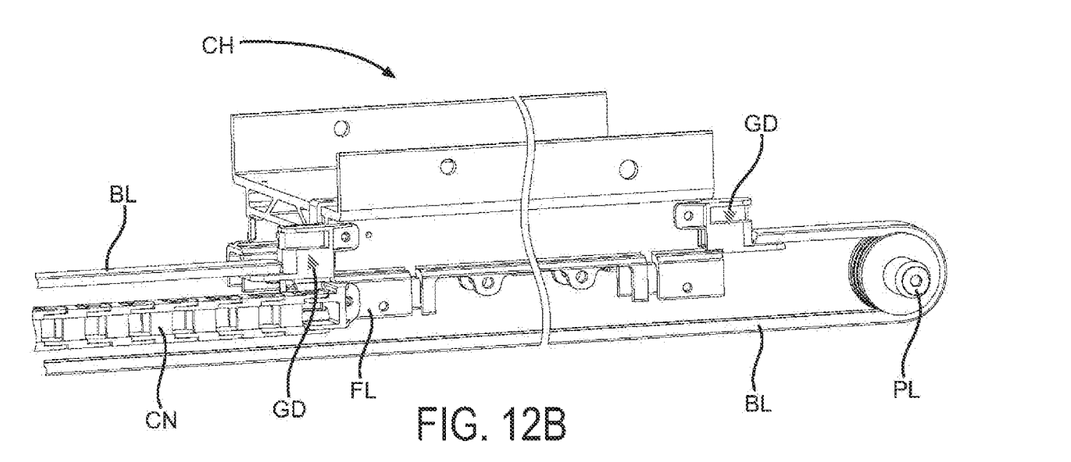
FIG. 12B is a schematic perspective cut-away view of a track system for an interior of a vehicle according to an exemplary embodiment.
Figure 13A:
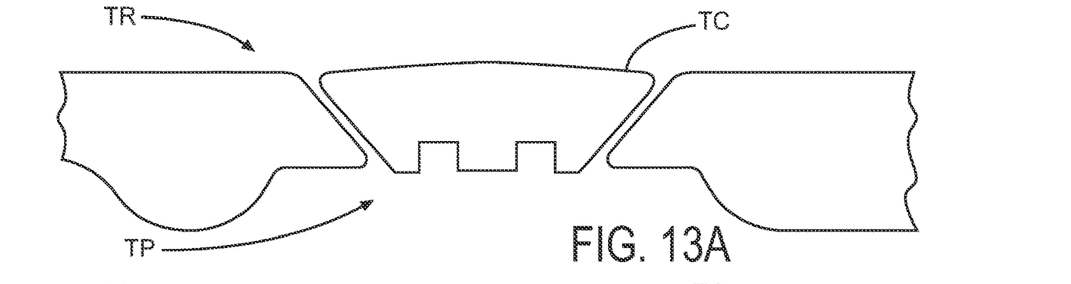
FIGS. 13A through 13E are a schematic partial section views of a track of a track system for an interior of a vehicle according to an exemplary embodiment.
Figure 13B:
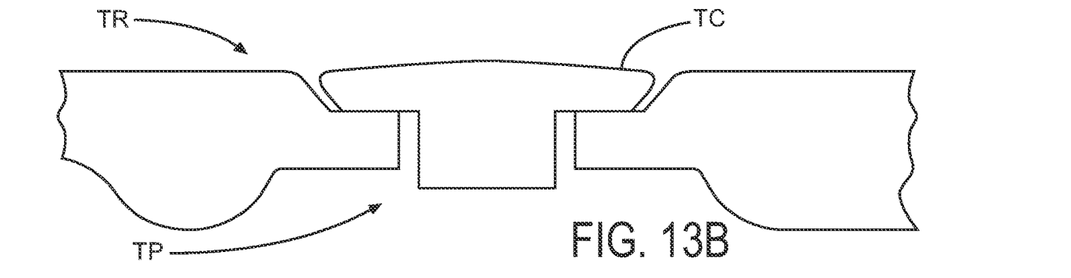
Figure 13C:
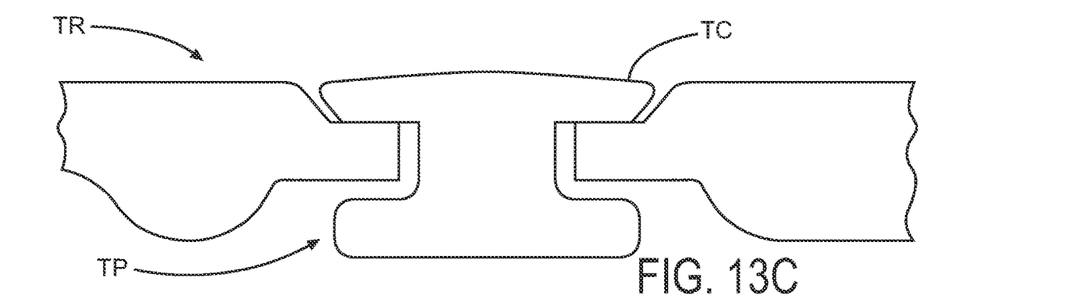
Figure 13D:
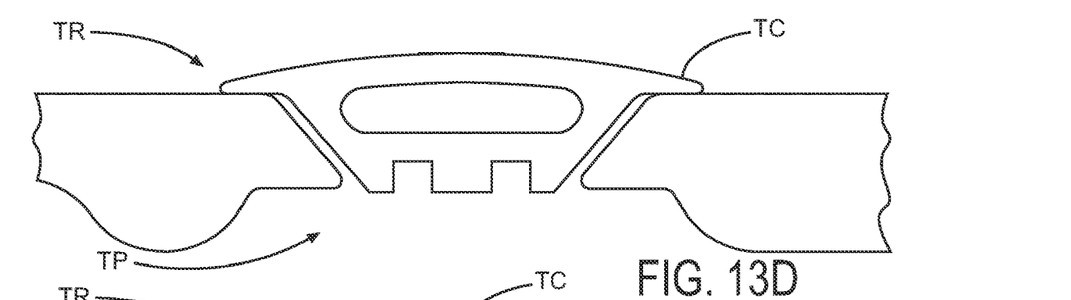

As shown schematically in FIG. 13D, track cover TC may comprise a central opening; track cover TC may comprise a hollow track cover TC. As shown schematically in FIG. 13B, track cover TC may comprise a T-shaped cross-section. As shown schematically in FIG. 13C, track cover TC may comprise an I-shaped cross-section. See also FIG. 13E. As shown schematically in FIGS. 5C, 9C, 13A, 13D and 13E, track cover TC may comprise a wedge-shaped cross-section. As shown schematically in FIGS. 4A-4B, 9C and 13A, track cover TC may comprise a belt BL having generally flat profile. As shown schematically in FIGS. 13A-13E, track cover TC may comprise a generally curved profile. As shown schematically in FIGS. 13B-13D, track cover TC may comprise a flap configured to fit over an edge of track opening TP. As shown schematically in FIGS. 13B-13D, the track may comprise flanges at track opening TP; the track may be configured to fit onto the flanges at track opening TP. The track cover/belt may comprise a generally flexible strip; the track cover may comprise a plastic material; the track cover may comprise an elastomeric material. As shown schematically in FIGS. 13C and 13E, track cover TC may comprise a groove configured to fit onto an edge of track opening TP. The track cover may comprise at least one of (a) a wedge-shaped cross-section; (b) a T-shaped cross-section; (c) an I-shaped cross-section. As shown schematically in FIGS. 13C and 13E, track cover TC may comprise a groove configured to fit onto a flange at track opening TP. As shown schematically in FIGS. 13A-13E, track cover TC may be configured to be sealed within track opening TP.

As shown schematically in FIGS. 2A-2B, 3A-3B, 4A-4B, 5A-5C, 9A-9C and 13A-13E, movable component C may be configured to be movable within track opening TP of track TR and track cover TC may be configured to fit within track opening TP of track TR; track cover TC may be moved from track opening TP as movable component C is moved within track opening TP; track cover TC may be positioned within track opening TP as movable component C is moved within track opening TP.

Figure 13E:
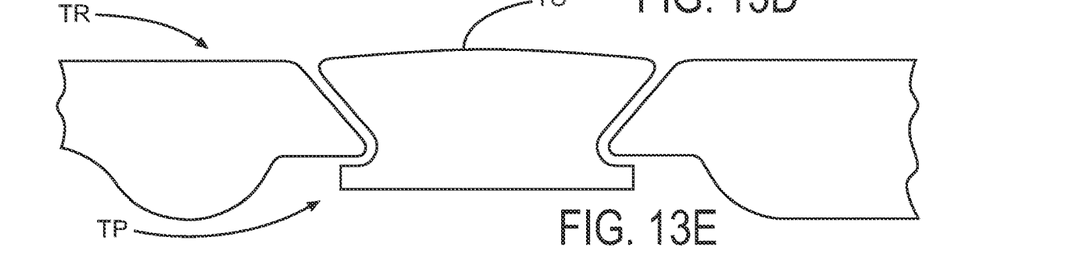

As shown schematically in FIG. 13E, track cover TC may comprise an undercut configured to align with a flange in a floor of the vehicle; track cover TC may comprise a generally constant cross section; a cross section of track cover TC may comprise a generally trapezoidal shape. The track cover may comprise an extrusion. As indicated schematically in FIGS. 2A-2B, 3A-3B, 4A-4B, 5A-5C, 6A-6B, 7A-7B, 8A-8B, 9A-9C, 10A-10B, 11A-11B, 12A-12B, track cover TC may be coupled to chassis CH. Track cover TC may be configured to bend to uncover the track; track cover TC may be configured to bend about an axis generally orthogonal to a direction of travel of chassis CH. Track cover TC may be configured to move along a generally curved path. As indicated schematically in FIGS. 2A-2B, 3A-3B, 4A-4B, 5A-5C, 6A-6B, 7A-7B, 8A-8B, 9A-9C, 10A-10B, 11A-11B, 12A-12B, track cover TC may comprise an exposed section and a hidden section; the hidden section may be configured to move in a generally opposite direction relative to a direction of movement of the exposed section; track cover TC may comprise a hidden section configured to move in a direction opposite a direction of movement of chassis CH.

According to an exemplary embodiment shown schematically in FIGS. 2A-2B, 3A-3B, 4A-4B, 5A-5C, 6A-6B, 7A-7B, 8A-8B, 9A-9C, 10A-10B, 11A-11B, 12A-12B and 13A-13E, a track system TS for providing a movable component C in an interior of a vehicle may comprise a track assembly TR comprising a track for movable component C and a base BS comprising a chassis CH for movable component C configured to be movable along the track of track assembly TR; track assembly TR may comprise a track cover TC; the base BS may comprise a set of guides configured to engage the track of track assembly TR; the track may comprise a set of tracks; the set of guides may comprise a set of wheels WH configured for the track of track assembly TR; track cover TC may be configured to cover the track. According to an exemplary embodiment shown schematically in FIGS. 3A-3B, 5A-5B, 6A-6B, 7A-7B and 8A-8B, track assembly TR may comprise a support for the base BS; the support may comprise a ramp RM.

According to an exemplary embodiment shown schematically in FIGS. 3A-3B, 5A-5B, 6A-6B, 7A-7B and 8A-8B, ramp RM may comprise a set of ramps RM; the set of guides of the base BS may be configured to engage the set of ramps RM of track assembly TR. Track cover TC may comprise a set of track covers TC; the set of track covers TC may be configured to engage the set of ramps RM. Track cover TC may comprise a set of track covers TC; the set of guides may comprise a set of wheels; the set of wheels WH may be configured to engage the set of track covers TC. According to an exemplary embodiment shown schematically in FIGS. 3A-3B, 5A-5B, 6A-6B, 7A-7B and 8A-8B, track assembly TR may comprise a set of ramps RM; the set of wheels WH may be configured to engage the set of track covers TC on the set of ramps RM.

According to an exemplary embodiment shown schematically in FIGS. 4A-4B, 9A-9B, 10A-10B, 11A-11B and 12A-12B, the set of track covers TC may comprise a set of belts BL engaged with a set of pulleys; track assembly TR may comprise a pulley arrangement PL; the pulley arrangement PL may comprise the set of pulleys; track assembly TR may comprise a pulley arrangement PL. According to an exemplary embodiment shown schematically in FIGS. 4A-4B, 9A-9B, 10A-10B, 11A-11B and 12A-12B, the set of track covers TC may comprise a set of belts BL; the set of pulleys PL may be configured to engage the set of belts BL. According to an exemplary embodiment shown schematically in FIGS. 2A-2B, 3A-3B, 4A-4B, 5A-5C, 9A-9C and 13A-13E, track cover TC may comprise a set of track covers TC; the set of guides may be configured to engage the set of track covers TC. According to an exemplary embodiment shown schematically in FIGS. 4A-4B, 9A-9B, 10A-10B, 11A-11B and 12A-12B, the set of track covers TC may comprise a set of belts BL; the set of guides may be configured to engage the set of belts BL; the set of guides may be configured to engage the set of belts BL engaged with a set of pulleys PL. According to an exemplary embodiment shown schematically in FIGS. 4A-4B, 9A-9B, 10A-10B, 11A-11B and 12A-12B, track assembly TR may comprise a link coupled to chassis CH; the link may comprise a chain CN coupled to a flange on chassis CH.

According to an exemplary embodiment shown schematically in FIGS. 4A-4B, 9A-9B, 10A-10B, 11A-11B and 12A-12B, a module MD may be configured for operation of track assembly TR.

According to an exemplary embodiment as shown schematically in FIGS. 2A-2B, 3A-3B and 4A-4B, track assembly TR may be configured to be installed in the interior of the vehicle. Movable component C may comprise at least one of a console; a floor console; a center console; a seat; an armrest; a module MD; a vehicle interior component C.

Exemplary Embodiments—B

According to an exemplary embodiment as shown schematically in FIGS. 2A-2B, 3A-3B, 4A-4B, 5A-5C, 9A-9C, track assembly TR/track may comprise a set of tracks.

According to an exemplary embodiment as shown schematically in FIGS. 4A-4B, 9A-9B, 10A-10B, 11A-11B and 12A-12B, base BS may comprise a set of guides GD configured to engage the track of track assembly TR; the set of guides may comprise a set of wheels WH configured for the track of track assembly TR.

According to an exemplary embodiment as shown schematically in FIGS. 2A-2B, 3A-3B, 4A-4B, 5A-5C, 9A-9C, track cover TC may be configured to cover the track. Track assembly TR may comprise a support SP for base BS. According to an exemplary embodiment as shown schematically in FIGS. 3A-3B 5A-5B, 6A-6B, 7A-7B and 8A-8B, support SP may comprise a ramp RM; ramp RM may comprise a set of ramps RM; the set of guides of the base BS may be configured to engage the set of ramps RM of track assembly TR; track cover TC may comprise a set of track covers TC; the set of track covers TC may be configured to engage the set of ramps RM; track cover TC may comprise a set of track covers TC; the set of guides may comprise a set of wheels WH; the set of wheels WH may be configured to engage the set of track covers TC; track assembly TR may comprise a set of ramps RM; the set of wheels WH may be configured to engage the set of track covers TC on the set of ramps RM.

According to an exemplary embodiment as shown schematically in FIGS. 4A-4B, 9A-9B, 10A-10B, 11A-11B and 12A-12B, the set of track covers TC may comprise a set of belts BL engaged with a set of pulleys PL; track assembly TR may comprise a pulley arrangement PL; pulley arrangement PL may comprise the set of pulleys; track assembly TR may comprise a pulley arrangement PL; the set of track covers TC may comprise a set of belts BL; pulley arrangement PL may comprise a set of pulleys; the set of pulleys PL may be configured to engage the set of belts BL; track cover TC may comprise a set of track covers TC; the set of guides may be configured to engage the set of track covers TC; the set of track covers TC may comprise a set of belts BL; the set of guides may be configured to engage the set of belts BL; the set of guides may be configured to engage the set of belts BL engaged with a set of pulleys.

According to an exemplary embodiment as shown schematically in FIGS. 4A-4B, 9A-9B, 10A-10B, 11A-11B and 12A-12B, the system may comprise a module MD configured for operation of track assembly TR. According to an exemplary embodiment as shown schematically in FIGS. 4A-4B, 9A-9B, 10A-10B, 11A-11B and 12A-12B, track assembly TR may comprise a link coupled to chassis CH; the link may comprise a chain CN coupled to a flange FL on chassis CH.

According to an exemplary embodiment as shown schematically in FIGS. 2A-2B, 3A-3B and 4A-4B, the track assembly may be configured to be installed in the interior of the vehicle. The movable component may comprise at least one of a console; a floor console; a center console; a seat; an armrest; a module; a vehicle interior component.

REFERENCE SYMBOL LIST

| ITEM | SYMBOL |
|---|---|
| Vehicle | V |
| Interior | I |
| Seat | S |
| Component/console (movable component) | C |
| base | BS |
| chassis | CH |
| track system | TS |
| track assembly/track | TR |
| track opening | TP |
| track cover | TC |
| Guides (set of guides) | GD |
| Wheels (set of wheels) | WH |
| Support | SP |
| Ramp | RM |
| Belts (set of belts) | BL |
| Pulleys (set of pulleys) | PL |
| Module | MD |
| Chain | CN |
| Flange | FL |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A track system for providing a movable component in an interior of a vehicle comprising:
   a track assembly comprising a track for the movable component;
   a base comprising a chassis for the movable component configured to be movable along the track of the track assembly; and
   a set of guides comprising a set of wheels;
   wherein the track assembly further comprises a track cover;
   wherein the track cover comprises a front section, a rear section and a middle section;
   wherein the chassis is configured to move along the track and to raise the track cover to uncover the track under the chassis;
   wherein the chassis comprises a set of ramps;
   wherein the set of ramps comprises a front ramp configured to raise the front section of the track cover as the chassis moves in a forward direction and a rear ramp configured to raise the rear section of the track cover as the chassis moves in a rearward direction;

wherein the chassis comprises the set of wheels configured to engage the track cover on the set of ramps;

wherein the set of guides is configured to engage the set of ramps.

2. The system of claim 1 wherein the middle section of the track cover is configured to be raised by the chassis relative to the front section of the track cover and the rear section of the track cover.

3. A track system for providing a movable component in an interior of a vehicle comprising:
- a track assembly comprising a track for the movable component;
- a base comprising a chassis for the movable component configured to be movable along the track of the track assembly; and
- a set of guides;
- wherein the track assembly further comprises a track cover;
- wherein the chassis is configured to lift the track cover to uncover the track under the chassis;
- wherein the track cover comprises a top side facing the vehicle interior, a left side and a right side;
- wherein the track cover is configured so that at least one of the left side and the right side forms an acute angle with the top side;
- wherein the chassis comprises a set of ramps comprising a front ramp configured to lift the track cover when the chassis is moved in a forward direction and a rear ramp configured to lift the track cover when the chassis is moved in a rearward direction;
- wherein the set of guides is configured to engage the set of ramps.

4. The system of claim 3 wherein the track cover comprises a generally constant cross section.

5. The system of claim 3 wherein the cross section of the track cover comprises a generally trapezoidal shape.

6. The system of claim 3 wherein the track cover comprises an extrusion.

7. The system of claim 3 wherein the track cover is seated in a track opening as the component is moved along the track.

8. The system of claim 3 wherein the chassis comprises a front support for the front ramp and a rear support for the rear ramp.

9. The system of claim 3 wherein as the chassis is guided for movement along the track in the forward direction a front section of the track cover is lifted by the front ramp and as the chassis is guided for movement in the rearward direction a rear section of the track cover is lifted by the rear ramp.

10. The system of claim 3 wherein the set of guides comprises a set of wheels; wherein the set of wheels comprises a front wheel and a rear wheel;
- wherein as the chassis is guided for movement along the track in the forward direction a front section of the track cover is lifted between the front wheel and the front ramp and as the chassis is guided for movement in the rearward direction a rear section of the track cover is lifted between the rear wheel and the rear ramp.

11. A track system for providing a movable component in an interior of a vehicle comprising:
- a track assembly comprising a track for the movable component and a track cover for the track;
- a base comprising a chassis for the movable component configured to be movable along the track of the track assembly; and
- a set of guides;
- wherein the track cover is configured to provide a front section and a rear section as the chassis is guided for movement along the track;
- wherein the chassis is configured to move along the track and to raise the track cover to uncover the track under the chassis;
- wherein the chassis comprises a set of ramps;
- wherein the set of ramps comprises a front ramp configured to raise the front section of the track cover as the chassis moves in a forward direction and a rear ramp configured to raise the rear section of the track cover as the chassis moves in a rearward direction;
- wherein the set of guides is configured to engage the set of ramps as the chassis is guided for movement along the track.

12. The system of claim 11 wherein the set of guides comprises a set of wheels.

13. The system of claim 12 wherein the set of wheels comprises a front wheel and a rear wheel.

14. The system of claim 13 wherein as the chassis is guided in movement along the track the front section of the track cover is configured to be engaged between the front ramp and the front wheel and the rear section of the track cover is configured to be engaged between the rear ramp and the rear wheel.

15. The system of claim 11 wherein the track cover comprises a top side facing the vehicle interior, a left side and a right side; wherein the track cover is configured so that at least one of the left side and the right side forms an acute angle with the top side.

16. A track system for providing a movable component in an interior of a vehicle comprising:
- a track assembly comprising a track for the component and a track cover for the track; and
- a base comprising a chassis for the component configured to be movable along the track in a forward direction and a rearward direction;
- wherein the chassis comprises a front ramp configured to lift the track cover as the chassis moves in the forward direction and a rear ramp configured to lift the track cover as the chassis moves in the rearward direction;
- wherein as the chassis is guided in movement along the track the track cover is configured to be engaged between the front ramp and a front wheel and the track cover is configured to be engaged between the rear ramp and a rear wheel.

17. The system of claim 16 wherein the track cover is configured to provide a front section and a rear section as the chassis is guided in movement along the track; wherein the front ramp is configured to lift the front section of the track cover as the chassis moves in the forward direction and the rear ramp is configured to lift the rear section of the track cover as the chassis moves in the rearward direction.

18. The system of claim 16 wherein the track cover comprises a top side facing the vehicle interior, a left side and a right side; wherein the track cover is configured so that at least one of the left side and the right side forms an acute angle with the top side.

* * * * *